March 23, 1937.  J. EGGEMANN  2,074,605
BORING TOOL
Filed Nov. 6, 1935
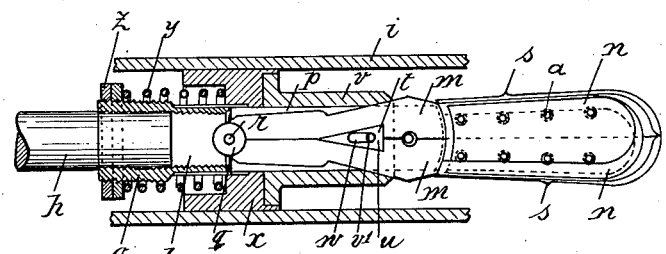
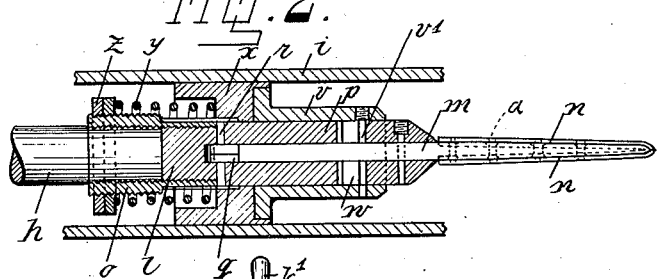
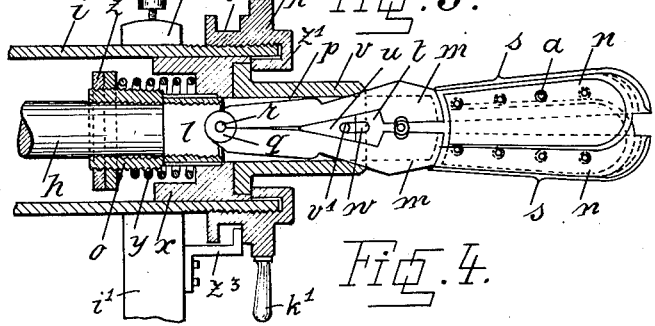
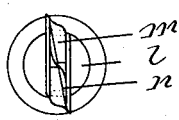
Inventor
Johannes Eggemann
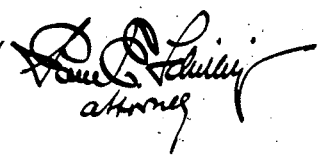

Patented Mar. 23, 1937

2,074,605

UNITED STATES PATENT OFFICE 2,074,605

BORING TOOL

Johannes Eggemann, Holm, Germany

Application November 6, 1935, Serial No. 48,465

3 Claims. (Cl. 145—124)

The present invention has reference to improvements in boring devices, and relates more particularly to a boring tool of expansible character, i. e., having spreadable cutting blades, for use in boring out cavities in wooden or composition blocks for the production of birds' nests and performing similar boring operations. Such a tool first bores a strictly cylindrical hole into the block and then, by gradual spreading apart of the cutting blades, enlarges the inner end of the hole into a more or less conical or bulbous cavity. For retracting the tool through the cylindrical entrance the blades are collapsed or returned to the starting position.

For the purpose indicated the tool essentially comprises a fixed protective guide sleeve, a rotary power spindle axially movable within this sleeve, boring or cutting members fulcrumed on the spindle, and means for spreading the cutting members apart in advance of the spindle and for collapsing them again on the return of the spindle.

In order to make this invention more readily understood, I will now describe it in detail with reference to the accompanying drawing, in which:

Fig. 1 is a longitudinal section, partly in side elevation, of the main elements of the boring device, with the operative parts in their initial rest position and their relation during the boring of the cylindrical hole.

Fig. 2 is a similar view taken at right angles to the plane of section in Fig. 1.

Fig. 3 shows a longitudinal section and part elevation of the device as it appears in the opened-out position of the cutting blades, during the boring out of the enlarged nest cavity.

Fig. 4 is a front elevation of the cutting members proper.

The device is operably supported within the fixed sleeve-like holder or housing $i$, which latter forms part of the spindle bearing $i^1$ of a conventional boring lathe. The front end $l$ of the power spindle $h$ is longitudinally slotted, and in this slot $p$ the inner ends $q$ of two opposed blade-supporting shanks $m$, $m$ are fitted and secured to the spindle by the pivot pin $r$. The outer tapering ends of these shanks are externally tapered and to such ends of the shanks are suitably secured the boring or cutting blades $n$, $n$, as by countersunk screws $a$. Small teeth $s$ extending from the cutting edges serve to cut circumferential step-rings into the wall of the bore.

The inner faces of the blade supporting shanks are provided with relative angularly disposed surfaces forming between them a wedge-shaped aperture $t$, within which is fitted the axially movable wedge piece $u$. This latter is operatively connected to the slide sleeve $v$ by means of the pin $v^1$. The sleeve $v$ can be axially moved on the spindle head $l$, and elongated slots $w$ are provided in the walls of the slotted part of the head $l$ for slidably receiving the pin $v^1$, whereby the wedge piece $u$ and the slide sleeve $v$ are controlled in their relative displacement. The sleeve $v$ is in rigid connection with the bearing member $x$, by which the tool is slidably and rotatably journaled within the fixed housing $i$. A sleeve $o$ is threaded onto the spindle end $h$, and a compression spring $y$ is interposed between the member $x$ and a retaining nut $z$ on the spindle section $h$, which spring normally holds the parts $u$, $v$, $x$, in the retracted position shown in Figs. 1 and 2, in which the cutters are also in retracted or collapsed condition.

The outer end of the housing $i$ is circumferentially threaded to receive a threaded adjusting ring $k$, from which radiate handles $k^1$ (Fig. 3), and the front end of this ring is formed in the shape of an inturned flange, as at $z^1$, to serve as a stop to limit the forward movement of the flange of the slide sleeve $v$ and bearing $x$. From the support $i^1$ extends a bracket $z^3$ (lower part of Fig. 3) for operation in the circumferential groove $z^2$ provided in the rotatable nut $k$, for limiting the relative outward movement of the latter.

In use, the tool is driven ahead by forward travel of the spindle to first bore a cylindrical hole in the wooden or other block, the several parts being in the position shown in Fig. 1. After the desired depth of hole is obtained, ring $k$ is adjusted by rotation on its support sleeve $i$, as shown in Fig. 3, to cause the sleeve $v$ and the wedge $u$ to be moved rearwardly in opposition to the compression spring $y$, whereby the cutting blades $n$, $n$ are gradually spread apart or expanded about their pivot $r$ to finally assume the fully expanded position shown in Fig. 3, during which spreading advance the bulbously enlarged nest hole or enlarged inner end of the bore is cut.

On reversing the movement of the ring $k$, the parts are returned into their initial position (Fig. 1) by the expansion of the spring $y$, in which action the cutting members are collapsed so that the tool can readily be withdrawn from the completed nest hole.

What I claim is:—

1. A boring tool of the character described comprising a holder, a spindle longitudinally slidable and rotatable in the holder, a sleeve in the holder, said sleeve and spindle being connected for sliding and rotating movements together and to allow a limited sliding movement of the spindle with respect to the sleeve, spreadable cutter blades having shanks pivoted to the spindle and slidably movable therewith in the sleeve, said shanks being held from spreading movement by the sleeve during longitudinal travel of the spindle and sleeve together and adapted to be released for spreading movement by independent forward sliding movement of the spindle in the sleeve, said spindle and sleeve having a predetermined degree of forward travel together short of the full range of forward travel of the spindle to cause the cutter blades to cut a bore of determined diameter, and means coacting with the sleeve for limiting its forward sliding travel with the spindle and for action on the shanks in a continued forward sliding travel of the spindle independent of the sleeve to spread the cutters to enlarge the diameter of the bore.

2. A boring tool of the character described comprising a holder, a spindle longitudinally slidable and rotatable in the holder, a sleeve in the holder, said sleeve and spindle being connected for sliding and rotating movements together and to allow a limited sliding movement of the spindle with respect to the sleeve, spreadable cutter blades having shanks pivoted to the spindle and slidably movable therewith in the sleeve, said shanks being held from spreading movement by the sleeve during longitudinal travel of the spindle and sleeve together and adapted to be released for spreading movement by independent forward sliding movement of the spindle in the sleeve, said spindle and seeve having a predetermined degree of forward travel together short of the full range of forward travel of the spindle to cause the cutter blades to cut a bore of determined diameter, spring means between the spindle and sleeve normally resisting such independent forward travel of the spindle with respect to the sleeve, means for arresting the forward travel of the sleeve with the spindle when a bore of determined depth and diameter has been cut, and means acting on the further forward travel of the spindle independent of the sleeve and release of the shanks to spread the shanks to cause the cutters to enlarge the diameter of the bore.

3. A boring tool of the character described comprising a holder, a spindle longitudinally slidable and rotatable in the holder, a sleeve in the holder, said sleeve and spindle being connected for sliding and rotating movements together and to allow a limited sliding movement of the spindle with respect to the sleeve, spreadable cutter blades having shanks pivoted to the spindle and slidably movable therewith in the sleeve, said shanks being held from spreading movement by the sleeve during longitudinal travel of the spindle and sleeve together and adapted to be released for spreading movement by independent forward sliding movement of the spindle in the sleeve, said spindle and sleeve having a predetermined degree of forward travel together short of the full range of forward travel of the spindle to cause the cutter blades to cut a bore of determined diameter, and means for arresting the forward travel of the sleeve with the spindle and means for controlling the cutter blades, said last mentioned means including a spreader acting on the shanks of the cutter blades on a continued forward travel of the spindle and the release of the shanks to spread the cutter blades to enlarge the diameter of the bore.

JOHANNES EGGEMANN.